United States Patent [19]

Imai

[11] Patent Number: 4,582,456

[45] Date of Patent: Apr. 15, 1986

[54] DRILL LIFTING AND LOWERING DEVICE FOR ELECTRIC DRILL

[75] Inventor: Kazuhisa Imai, Gunma, Japan

[73] Assignee: Kabushiki Kaisha Imai Tetsukojo, Ohta, Japan

[21] Appl. No.: 578,614

[22] Filed: Feb. 13, 1984

Related U.S. Application Data

[63] Continuation of Ser. No. 206,074, Nov. 12, 1980, abandoned.

[30] Foreign Application Priority Data

Nov. 14, 1979 [JP] Japan ................................ 54-147289

[51] Int. Cl.4 ............................................ B23B 45/14

[52] U.S. Cl. .................................... 408/136; 408/712

[58] Field of Search ..................... 408/76, 136, 712, 7, 408/234, 241; 409/144

[56] References Cited

U.S. PATENT DOCUMENTS

| | | | |
|---|---|---|---|
| 545,611 | 9/1895 | Reeve | 408/136 X |
| 562,005 | 6/1896 | Law | 408/136 |
| 1,513,786 | 11/1924 | Rose | 408/136 X |
| 2,405,110 | 8/1946 | Bullock | 408/136 X |
| 2,444,562 | 7/1948 | Fried | 408/136 |
| 2,879,678 | 3/1959 | Kaiser, Jr. | 408/76 |
| 3,387,509 | 6/1968 | Lupear | 408/76 |

*Primary Examiner*—Z. R. Bilinsky

*Attorney, Agent, or Firm*—Browdy and Neimark

[57] ABSTRACT

An improvement in the portable electric drill. The drill shaft of the electric drill is supported for up and downward movement and is provided with a lifting and lowering lever. The lifting and lowering lever is carried by a bracket which also supports a drilling object holding device. In the drilling operation, the drill device as a whole is supported by the drilling object holding device so that the lifting and lowering lever can be manipulated safely and efficiently.

5 Claims, 2 Drawing Figures

DRILL LIFTING AND LOWERING DEVICE FOR ELECTRIC DRILL

This application is a continuation, of application Ser. No. 206,074, filed Nov. 12, 1980, now abandoned.

BACKGROUND OF THE INVENTION

The present invention relates to a drill lifting and lowering device of electric drills.

In use of conventional electric drills of portable type, the drills are pressed against the drilling object solely by manual force. Therefore, the working place and position of the operator are impractically limited which in turn imposes quite a heavy fatigue of the operator.

SUMMARY OF THE INVENTION

It is, therefore, an object of the invention to elminiate the above-described problem of the prior art, by providing a drill lifting and lowering device for electric drills, comprising means for supporting a drill shaft for free up and downward movement, and a lifting and lowering lever associated with the drill shaft, so that the drill can be lifted and lowered easily by manipulation of the lever.

Another object of the invention is to provide a drill lifting and lowering device for electric drills, wherein a bracket supporting the lifting and lowering lever carries also a device for holding the drilling object, so that the lifting and lowering lever can be manipulated with the drill body held by the drilling object to ensure a safe and efficient drilling operation.

To these ends, according to the invention, there is provided a drill lifting and lowering device for electric drills, characterized by comprising: an attaching guide fixed to a bearing portion of the drill body; a drill shaft adapted to be rotated in accordance with the rotation of the drill body and received by the attaching guide for free up and downward movement; a bracket provided at the outside of the attaching guide and provided with a drilling object holding device; a lifting and lowering lever pivotally supported by the bracket; and a guide collar loosely fitted to the drill shaft and provided with an engaging groove engaged by the end of the lifting and lowering lever.

The above and other objects, as well as advantageous features of the invention will become clear from the following description of the preferred embodiment taken in conjunction with the accompanying drawings.

DESCRIPTION OF THE PREFERRED EMBODIMENT

Figure 1:
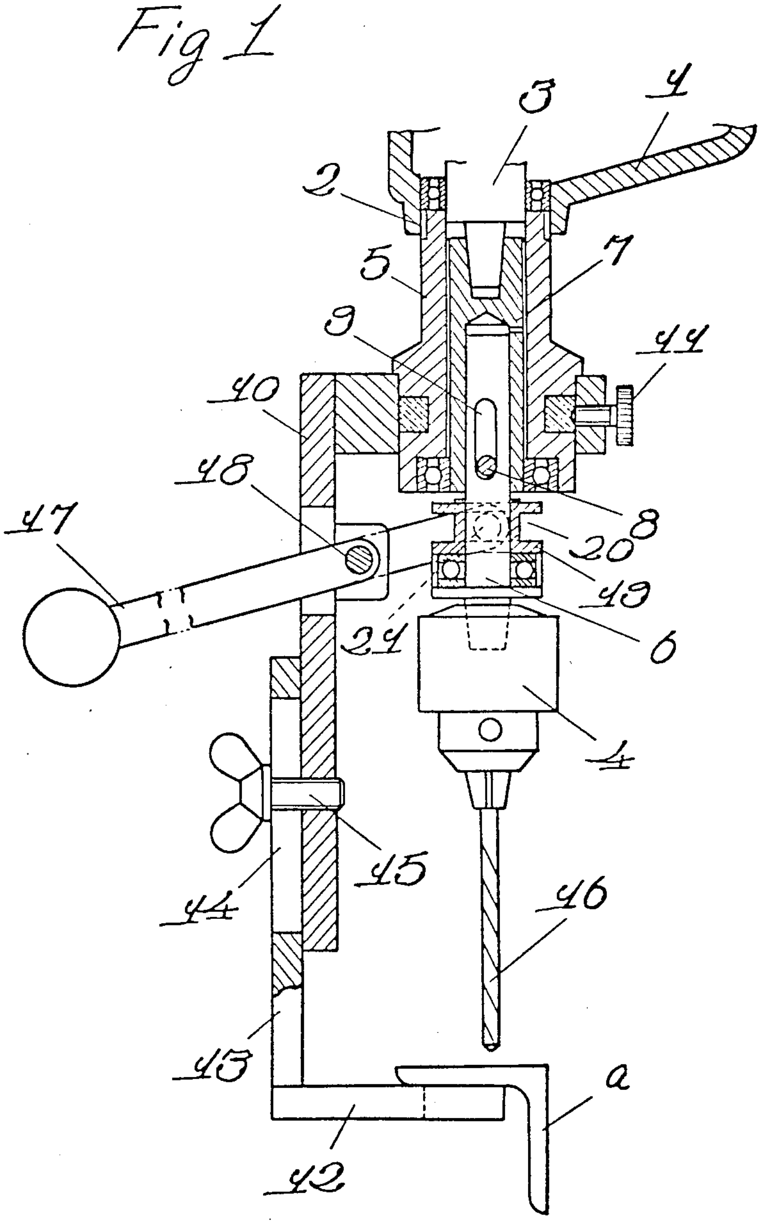
FIG. 1 is a longitudinal sectional view of an embodiment of the invention.

Referring to the drawings, a reference numeral 1 designates a drill device which is an ordinary electric drill. A reference numeral 2 denotes a bearing portion of the drill device 1, adapted to rotatably support a rotary shaft 3. Usually, a drill chuck 4 is directly attached to the bearing portion 2. A reference numeral 5 designates an attaching guide secured to the bearing portion 2. This guide 5 is a cylindrical guiding member adapted for supporting a drill shaft 6 for free up and downward movement. If the guide 5 is secured detachably by means of screws, it can be detachably replaced with the drill chuck 4 so that the conventional electric drill can be used directly.

A sleeve 7 is rotatably received by the attaching guide 5 and adapted to be disengageably engaged at its one end by the rotary shaft 3 so as to be rotated together with the latter. The drill shaft 6 is slidably mounted in the guide bore of the sleeve 7. Namely, the sleeve 7 has a pin 8 which is received by an elongated hole 9 formed in the drill shaft. The drill chuck 4 is fitted to and supported by the end of the drill shaft 6. A reference numeral 10 designates a bracket which is rotatably supported such that its position in relation to the attaching guide 5 may be changed. A reference numeral 11 denotes a fixing screw.

A drilling object holding device denoted by a numeral 12 has a supporting lever 13 by means of which it is attached to the bracke 10, and is extended to the position to which the drill 16 is lowered. The position of the drilling object holding device 12 is adjustable in the vertical direction by means of an elongated hole 14 formed in the supporting lever 13 and a screw 15 provided in the bracket 10.

In case that the drilling object holding device 12 is formed as a supporting plate as shown in FIG. 1, the drilling object (a) is contacted at its rear side by the supporting plate, so that the drilling is made effectively with the drilling object (b) clamped between the supporting plate as the drilling object holding device 12 and the drill 16. The drilling device, therefore, can effectively be used for the drilling in already-constructed steel structures.

Figure 2:
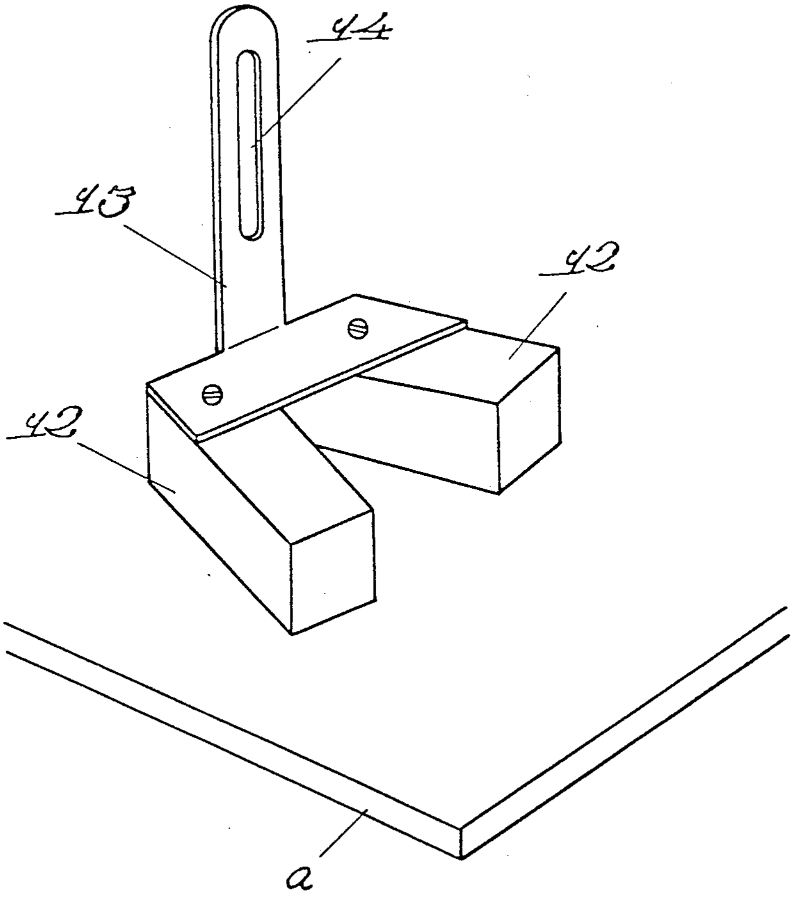
FIG. 2 is a perspective view of an essential part of the embodiment shown in FIG. 1.

FIG. 2 shows another form of the drilling object supporting device 12. Namely, in this case, the drilling object supporting device 12 is composed of a permanent magnet adapted to attract and hold the drilling object. Since the permanent magnet attaches to the surface of the drilling object, the drilling object holding device incorporating the permanent magnet is suitable for use in the drilling in a drilling object having a flat surface. Furthermore, although not illustrated, the drilling object holding device 12 can be constituted by screws.

A reference numeral 17 designates a lifting and lowering lever having a support shaft 18 carried by the bracket 10. A guide collar 19 loosely fitted to the drill shaft 6 is provided in its periphery with an engaging groove 20 which engages the end 21 of the lifting and lowering lever 17.

In use of the device of the invention having the described construction, the drill shaft 6 and, accordingly, the drill chuck 4 and the drill 16, are lowered to drill a bore in the drilling object (a), as the lifting and lowering lever 17 is operated while supporting the drilling object (a) by the drilling object holding device 12.

Thus, in the device of the invention, the drill 16 of the electric is lowered by a lever action of the lifting and lowering lever 17, so that the drilling is made quite easily.

In addition, since the drilling object holding device 12 is supported by the drill device 1, the latter can stably be held perpendicularly to the drilling object (a), so that the work is facilitated very much and the bore is drilled correctly perpendicularly.

Furthermore, since the drill 16 is freely moved up and down by the lifting and lowering lever 17, while the drill device 1 is carried by the drilling object supporting device 12, it becomes possible to conduct the drilling work at such restricted, high or low places where the drilling work could never be made efficiently with the conventional drills.

Finally, the drill lifting and lowering device of the invention, having a simple construction, can be easily attached to existing electric drills.

What is claimed is:

1. Apparatus for lifting and lowering a drill bit, associated with and powered by a portable electric drill, relative to a workpiece, comprising:

a cylindrical attaching guide fixed to a bearing portion of the drill, said guide including a vertically extending bore, a sleeve in said bore and pin means extending normal to, and across, said bore;

a drill shaft having an elongaged slot therein and being supported in said cylindrical attaching guide for free vertical movement therein, said pin means coupling said shaft to said guide, said drill shaft being rotatable with rotation of the rotary shaft of said drill;

an L-shaped bracket including a first portion disposed parallel to the longitudinal axis of said rotary shaft and a second portion, substantially normal to said first portion, said second portion being attached to said attaching guide, said first portion being attached to an L-shaped drilling object holding plate by means for adjustably moving said first portion relative to said L-shaped drilling object holding plate in a vertical direction, said L-shaped drilling object holding plate, in cooperation with said bracket, defining plate means for suspendingly supporting said drill against said workpiece by hooking the latter;

lever means, pivotably attached to said bracket first portion, for vertically moving said drill shaft;

and a guide collar loosely fitted to said drill shaft and having groove means therein, said lever means having one end engaged with said groove means, said one end and the other end of said lever means being disposed on opposite sides of the point of attachment of said lever means to said bracket first portion;

whereby upward pivotal movement of the other end of the lever means about its point of attachment to the bracket first portion causes downward movment of the drill shaft, and downward pivotal movement of said other end causes upward movement of said drill shaft.

2. The device of claim 1, wherein said attaching guide is detachably secured to said drill device.

3. The device as set forth in claim 1, wherein said means for adjustably moving said first portion relative to said drilling object holding plate comprises a vertically extensive slot in said drilling object holding plate, and fastening means, coupled to said first portion and extending through said slot, for fixedly securing said first portion in a selected position relative to said drilling object holding plate.

4. Apparatus for lifting and lowering a drill bit, associated with and powered by a portable electric drill, relative to a workpiece, comprising:

a cylindrical attaching guide fixed to a bearing portion of the drill, said guide including a vertically extending bore, and a rotatable sleeve in said bore including pin means extending normal to, and across, said bore;

a drill shaft having an elongated slot therein and being supported in said cylindrical attaching guide for free vertical movement therein, said pin means extending through said slot and coupling said shaft to said guide, said drill shaft being rotatable with rotation of the rotary shaft of said drill;

an L-shaped bracket including a first portion disposed parallel to the longitudinal axis of said rotary shaft and a second portion, substantially normal to said first portion, said second portion being attached to said attaching guide, said first portion being attached to an L-shaped drilling object holding plate by means for adjustably moving said first portion relative to said L-shaped drilling object holding plate in a vertical direction, said L-shaped drilling object holding plate, in cooperation with said bracket, defining plate means for suspendingly supporting said drill against said workpiece by hooking the latter;

lever means, pivotably attached to said bracket first portion, for vertically moving said drill shaft;

and a guide collar loosely fitted to said drill shaft and having groove means therein, said lever means having one end engaged with said groove means, said one end and the other end of said lever means being disposed on opposite sides of the point of attachment of said lever means to said bracket first portion;

whereby upward pivotal movement of the other end of the lever means about its point of attachment to the bracket first portion causes downward movment of the drill shaft, and downward pivotal movement of said other end causes upward movement of said drill shaft.

5. Apparatus for converting a conventional, handheld portable drill into a portable drill press, the portable drill including a rotatable shaft, a bearing portion cooperating with said rotatable shaft, a drill chuck and a drill bit secured within, and projecting forwardly of, the drill chuck, said apparatus comprising:

cylindrical guide means secured at one end to said bearing portion of said portable drill and extending forwardly thereof;

a rotatable sleeve housed concentrically within said guide means, said sleeve including a rearwardly directed bore having means for engaging said rotatable shaft, and a forwardly directed bore, said sleeve further including pin means extending normal to, and across, said forwardly directed bore;

a drill shaft having one end slidably supported in said forwardly directed bore and a second end secured to the rear portion of said drill chuck, said one end of said drill shaft including an elongated slot;

said sleeve pin means extending through said slot and defining, with said slot, means for guiding said shaft one end relative to the longitudinal axis of, and within, said forwardly directed bore;

collar means loosely fitted about said drill shaft and disposed on said drill shaft between the forwardmost end of said guide means and said drill chuck;

bracket means having a first portion disposed parallel to the longitudinal axis of said forwardly directed bore, a second portion disposed substantially normal to said first portion and secured about said guide means, and a third portion disposed parallel to said second portion, said third portion having surface means disposed forwardly of said drill chuck and facing rewardly; and lever means pivotably supported on said bracket first portion; said lever means having a first end secured to said collar means and a second end, said first and second ends of said lever means being disposed on opposite sides of the point of attachment of said lever means with said bracket first portion, whereby drilling in a workpiece may be accomplished by hooking the third portion surface means behind said workpiece and using the pivotable lever means to move the drill bit first forwardly to effect drilling in the workpiece and then rearwardly to remove the drill bit from the drilled bore.

* * * * *